(12) United States Patent
Sako et al.

(10) Patent No.: US 10,140,933 B2
(45) Date of Patent: Nov. 27, 2018

(54) DISPLAY APPARATUS AND METHOD FOR DRIVING DISPLAY APPARATUS

(71) Applicant: Japan Display Inc., Tokyo (JP)

(72) Inventors: Kazuhiko Sako, Tokyo (JP); Naoyuki Takasaki, Tokyo (JP); Tsutomu Harada, Tokyo (JP); Tatsuya Yata, Tokyo (JP); Shigenori Aoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/496,447

(22) Filed: Apr. 25, 2017

(65) Prior Publication Data

US 2017/0316746 A1    Nov. 2, 2017

(30) Foreign Application Priority Data

May 2, 2016  (JP) ................................ 2016-092713
Apr. 20, 2017  (JP) ................................ 2017-083776

(51) Int. Cl.
*G09G 3/34* (2006.01)
*G02B 27/01* (2006.01)

(52) U.S. Cl.
CPC ....... *G09G 3/3426* (2013.01); *G02B 27/0101* (2013.01); *G02B 2027/0118* (2013.01); *G09G 2320/0646* (2013.01); *G09G 2360/16* (2013.01)

(58) Field of Classification Search
CPC ................. G09G 3/342; G09G 3/3426; G09G 2320/0646

USPC ................................. 345/102; 362/97.1–97.4
See application file for complete search history.

(56) References Cited

U.S. PATENT DOCUMENTS

2009/0140665 A1* 6/2009 Park .................... G09G 3/3426
                                                               315/291
2016/0293087 A1  10/2016 Sako et al.

FOREIGN PATENT DOCUMENTS

JP      2013-246426 A    12/2013
JP      2016-188883 A    11/2016

* cited by examiner

*Primary Examiner* — Michael Pervan
(74) *Attorney, Agent, or Firm* — Michael Best & Friedrich LLP

(57) ABSTRACT

According to an aspect, a display apparatus includes: a plurality of light sources; a display device irradiated with light from the light sources; and a controller. The display area includes a plurality of partial areas corresponding to the light sources on a one-to-one basis. Each of the partial areas includes a first area and a second area, the first area being irradiated with light from a first light source that corresponds thereto, and the second area being irradiated with light from the first light source and a second light source adjacent to the first light source. The controller controls an operation of the first light source based on whether the first area requires the light from the first light source and whether the second area obtains light required for display output by receiving the light from the second light source.

10 Claims, 8 Drawing Sheets

DISPLAY APPARATUS AND METHOD FOR DRIVING DISPLAY APPARATUS

CROSS-REFERENCE TO RELATED APPLICATIONS

This application claims priority from Japanese Application No. 2016-092713, filed on May 2, 2016 and Japanese Application No. 2017-083776, filed on Apr. 20, 2017, the contents of which are incorporated by reference herein in its entirety.

BACKGROUND

1. Technical Field

The present invention relates to a display apparatus and a method for driving the display apparatus.

2. Description of the Related Art

Widely known are display apparatuses having a local dimming function of dividing a light emitting surface of a light source device, such as a backlight, into a plurality of areas and controlling light emission from light sources in each of the divided areas individually based on a video signal for the area. An example of such display apparatuses is disclosed in Japanese Patent Application Laid-open Publication No. 2013-246426.

In view of power saving, light sources are preferably turned off in areas where turning off of the light sources causes no hindrance in video output. To perform video output that requires light from the light sources in the respective divided areas (e.g., video output including one or more pixels of colors other than black), however, the conventional display apparatuses perform control for securing required luminance for the areas with light from the light sources corresponding to the respective areas. This makes it difficult to achieve power saving.

For the foregoing reasons, there is a need for a display apparatus that can achieve power saving and a method for driving the display apparatus.

SUMMARY

According to an aspect, a display apparatus includes: a plurality of light sources aligned in at least one direction; a display device that has a display area provided with a plurality of pixels, the display device being irradiated with light from the light sources to output an image; and a controller that controls an operation of the light sources in accordance with a display output content of the display device. The display area includes a plurality of partial areas, the partial areas corresponding to the light sources on a one-to-one basis. Each of the partial areas includes a first area and a second area, the first area being irradiated with light from a first, light source that corresponds thereto, and the second area being irradiated with light from the first light source that corresponds to the first area and a second light source adjacent to the first light source that corresponds to the first area. The controller controls an operation of the first light source based on whether the first area requires the light from the first light source and whether the second area obtains light required for display output by receiving the light from the second light source.

According to another aspect, a method for driving a display apparatus, the display apparatus including: a plurality of light sources aligned in at least one direction; a display device that has a display area provided with a plurality of pixels, the display device being irradiated with light from the light sources to output an image; and a controller that controls an operation of the light sources in accordance with a display output content of the display device, the display area including a plurality of partial areas, the partial areas corresponding to the light sources on a one-to-one basis, and each of the partial areas including a first area and a second area, the first area being irradiated with light from a first light source that corresponds thereto, and the second area being irradiated with light from the first light source that corresponds to the first area and a second light source adjacent to the first light source that corresponds to the first area, the method includes controlling an operation of the first light source based on whether the first area requires the light from the first light source and whether the second area obtains light required for display output by receiving the light from the second light source.

DETAILED DESCRIPTION

Figure 1:
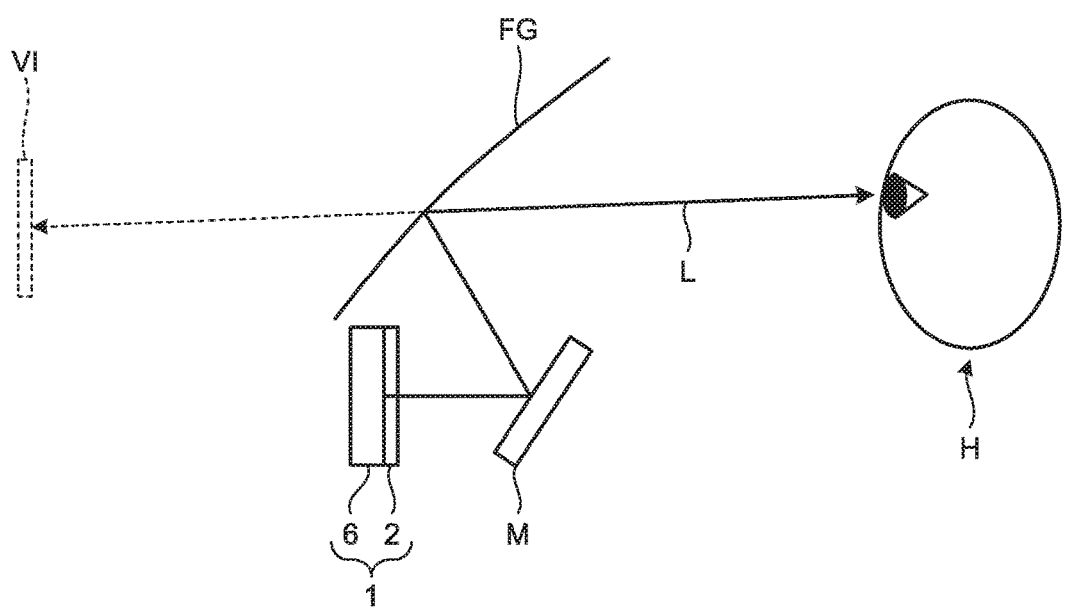
FIG. 1 is a diagram schematically illustrating a main configuration of a display apparatus according to an embodiment.

Exemplary embodiments according to the present invention are described below with reference to the accompanying drawings. The disclosure is given by way of example only, and appropriate changes made without departing from the spirit of the invention and easily conceivable by those skilled in the art are naturally included in the scope of the invention. To simplify the explanation, the drawings may possibly illustrate the width, the thickness, the shape, and the like of each unit more schematically than the actual aspect. These elements, however, are given by way of example only and are not intended to limit interpretation of the invention. In the present specification and the figures, components similar to those previously described with reference to preceding figures are denoted by the same reference numerals, and overlapping explanation thereof may be appropriately omitted.

In this disclosure, when an element is described as being "on" another element, the element can be directly on the other element, or there can be one or more elements between the element and the other element.

FIG. 1 is a diagram schematically illustrating a main configuration of a display apparatus 1 according to an embodiment. The display apparatus 1 includes a light source device 6 and a display device 2, for example. The display device 2 outputs an image using light L from the light source device 6 as a light source. The light L emitted from the light source device 6 is reflected by the display device 2, a mirror M, and a windshield FG to reach a user H. As a result, the light L is recognized as an image VI in a field of vision of the user H. In other words, the display apparatus 1 according to the present embodiment serves as a head-up display apparatus (HUD) using the mirror M and the windshield FG.

The following describes the display device 2. The display device 2 according to the present embodiment is a transmissive liquid crystal display device that outputs an image using the light L as a light source. Alternatively, the display device 2 may be a reflective liquid crystal display device or a digital micromirror device (DMD, registered trademark), for example.

Figure 2:
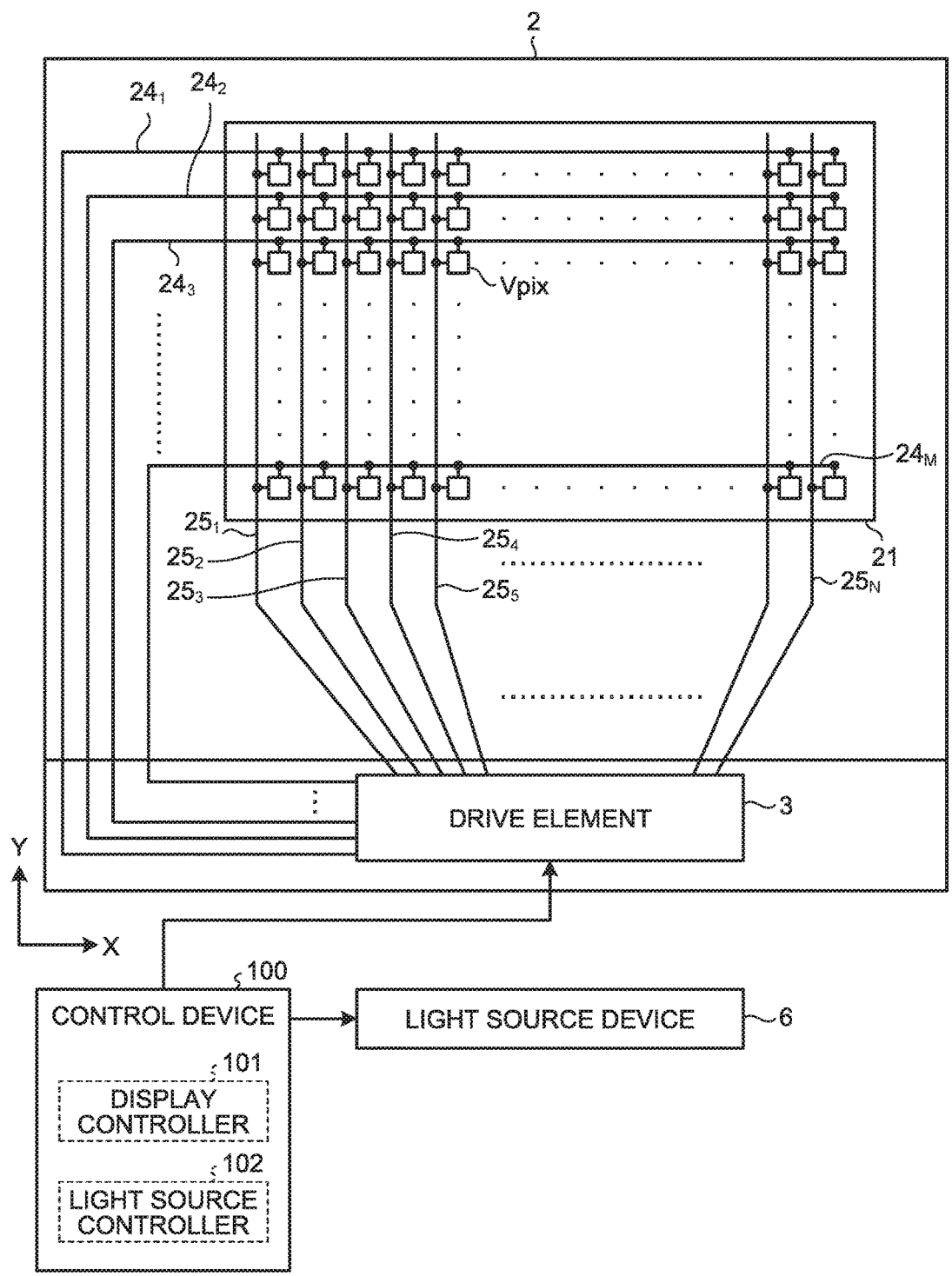
FIG. 2 is a block diagram of an exemplary system, configuration of a display device according to the present embodiment.
Figure 3:
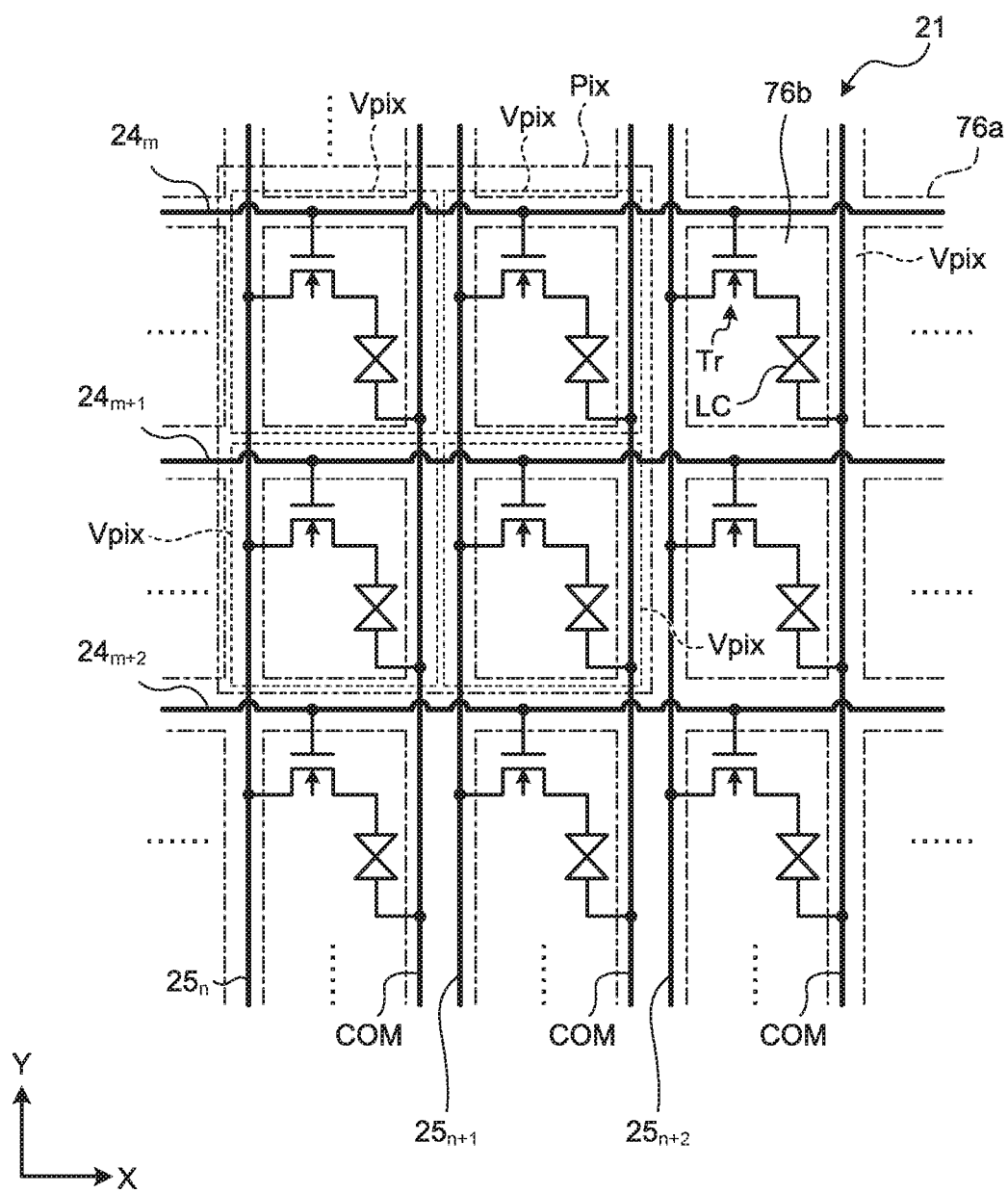
FIG. 3 is a circuit diagram of a drive circuit that drives pixels in the display device according to the present embodiment.

FIG. 2 is a block diagram of an exemplary system configuration of the display device 2 according to the present embodiment. FIG. 3 is a circuit diagram of a drive circuit that drives pixels Pix in the display device 2 according to the present embodiment. The pixel Pix includes a plurality of sub-pixels Vpix. The display device 2 is a transmissive liquid crystal display device, for example, and includes an image output panel and a drive element 3, such as a display driver integrated circuit (DDIC).

The image output panel includes a translucent insulating substrate, such as a glass substrate. The image output panel further includes a display area 21 on the surface of the glass substrate. In the display area 21, a plurality of pixels Pix (refer to FIG. 3) including a liquid crystal cell are arranged in a matrix (rows and columns). The glass substrate includes a first substrate and a second substrate. The first substrate has a plurality of pixel circuits including an active element (e.g., a transistor) and arranged in a matrix. The second substrate is arranged facing the first substrate with a predetermined gap interposed therebetween. The gap between the first substrate and the second substrate is maintained at the predetermined gap by photo spacers arranged at a plurality of positions on the first substrate. The gap between the first substrate and the second substrate is sealed with liquid crystals. The arrangement and the sizes of the components illustrated in FIG. 2 are given by way of schematic example only, and they do not indicate actual arrangement and the like.

The display area 21 has a matrix (row-and-column) structure in which M×N sub-pixels Vpix including a liquid crystal layer are arranged. In the present specification, a row indicates a pixel row including N sub-pixels Vpix arrayed in one direction. A column indicates a pixel column including M sub-pixels Vpix arrayed in a direction orthogonal to the direction in which the row extends. The values of M and N are determined depending on resolution in the vertical direction and resolution in the horizontal direction, respectively. In the display area 21, scanning lines $24_1$, $24_2$, $24_3$, . . . , and $24_M$ are arranged in respective rows, and signal lines $25_1$, $25_2$, $25_3$, . . . , and $25_N$ are arranged in respective columns for the array of M×N sub-pixels Vpix. In the present embodiment, the scanning lines $24_1$, $24_2$, $24_3$, . . . , and $24_M$ may be collectively referred to as scanning lines 24, and the signal lines $25_1$, $25_2$, $25_3$, . . . , and $25_N$ may be collectively referred to as signal lines 25. In the present embodiment, certain three scanning lines out of the scanning lines $24_1$, $24_2$, $24_3$, . . . , and $24_M$ are referred to as scanning lines $24_m$, $24_{m+1}$, and $24_{m+2}$ (m is a natural number satisfying m≤M−2), and certain three signal lines out of the signal lines $25_1$, $25_2$, $25_3$, . . . , and $25_N$ are referred to as signal lines $25_n$, $25_{n+1}$, and $25_{n+2}$ (n is a natural number satisfying n≤N−2).

The drive element 3 is a circuit mounted on the glass substrate of the image output panel by chip-on-glass (COG) technology, for example. The drive element 3 is coupled to a control device 100 via flexible printed circuits (FPC), which are not illustrated. The control device 100 is a circuit that controls operations of the display device 2 and the light source device 6. Specifically, the control device 100 serves as a display controller 101 and a light source controller 102, for example. The display controller 101 outputs a pixel signal for individually driving a plurality of sub-pixels Vpix constituting the pixel Pix. The pixel signal is obtained by combining respective gradation values of red (R), green (G), blue (B), and white (W), which will be described later, for example. The types and the number of colors corresponding to the respective gradation values constituting the pixel signal are arbitrarily determined. The display controller 101 has a function of controlling output gradation values of part or all of a plurality of pixels based on the amount of light emission from a light source 6a controlled by the light source controller 102. The light source controller 102 controls operations of the light source 6a in accordance with the display output contents of the display device 2. Specifically, the light source controller 102 individually controls operations of a plurality of light sources 6a included in the light source device 6. The control device 100 may have a function of outputting various signals (e.g., master clocks, horizontal synchronization signals, and vertical synchronization signals) used for the operations of the display device 2. The structure that outputs the various signals may be separately provided.

The light source controller 102 according to the present embodiment performs what is called one-frame delay control of controlling the operations of the light sources 6a based on the pixel signals output from the display controller 101 in the previous frame. By performing the one-frame delay control, the light source controller 102 does not require any buffer that holds the pixel signals, which is necessary for controlling the operations of the light sources 6a in the same frame as that of the pixel signals. The light source controller 102 may include a buffer to control the operations of the light sources 6a in the same frame as that of the pixel signals.

The display device 2 is coupled to an external input power source, which is not illustrated, for example. The external input power source supplies electric power required for the operations of the display device 2.

More specifically, the drive element 3 operates the display device 2 based on the various signals supplied from the control device 100, for example. The control device 100 outputs the master clocks, the horizontal synchronization signals, the vertical synchronization signals, the pixel signals, and drive command signals for the light source device 6, for example, to the drive element 3. Based on these signals, for example, the drive element 3 serves as a gate driver and a source driver. One or both of the gate driver and the source driver may be provided on the substrate using a thin film transistor (TFT), which will be described later. In this case, one or both of the gate driver and the source driver are electrically coupled to the drive element 3. The source driver and the gate driver may be electrically coupled to different drive elements 3 or the same single drive element 3.

The gate driver latches digital data in units of one horizontal period based on the horizontal synchronization signals in synchronization with the vertical synchronization signals and the horizontal synchronization signals. The gate driver sequentially outputs and supplies the latched digital data of one line as a vertical scanning pulse to each of the scanning lines 24 (scanning lines $24_1$, $24_2$, $24_3$, ..., and $24_M$) of the display area 21. The gate driver thus sequentially selects the sub-pixels Vpix row by row. The gate driver, for example, sequentially outputs the digital data to the scanning lines $24_1$, $24_2$, ... in the row direction, that is, from a first end side to a second end side of the display area 21. Alternatively, the gate driver may sequentially output the digital data to the scanning lines $24_M$... in the row direction, that is, from the second end side to the first end side of the display area 21.

The source driver is supplied with data for driving pixels generated based on the pixel signals, for example. The source driver writes the data for driving pixels to the sub-pixels Vpix of the row selected in vertical scanning performed by the gate driver in units of a sub-pixel, a plurality of sub-pixels, or all the sub-pixels via the signal lines 25 (signal lines $25_1$, $25_2$, $25_3$, ..., and $25_N$).

Some types of methods for driving a liquid crystal display device are known, including line inversion, dot inversion, and frame inversion driving methods. The line inversion driving method is a method of reversing the polarity of video signals at a time period of 1H (H denotes a horizontal period) corresponding to one line (one pixel row). The dot inversion driving method is a method of alternately reversing the polarity of video signals for sub-pixels adjacent to each other in two intersecting directions (e.g., row-and-column directions). The frame inversion driving method is a method of reversing the polarity of video signals to be written to all the sub-pixels Vpix in one frame corresponding to one screen with the same polarity at a time. The display device 2 may employ any one of the above-described driving methods.

In the description of the present embodiment, the M scanning lines $24_1$, $24_2$, $24_3$, ..., and $24_M$ may be referred to as the scanning lines 24 when they are collectively handled. Scanning lines $24_m$, $24_{m+1}$, and $24_{m+2}$ illustrated in FIG. 3 are part of the M scanning lines $24_1$, $24_2$, $24_3$, ..., and $24_M$. The N signal lines $25_1$, $25_2$, $25_3$, ..., and $25_N$ may be referred to as the signal lines 25 when they are collectively handled. Signal lines $25_n$, $25_{n+1}$, and $25_{n+2}$ illustrated in FIG. 3 are part of the N signal lines $25_1$, $25_2$, $25_3$, ..., and $2\,5_N$.

The display area 21 is provided with wiring of the signal lines 25 and the scanning lines 24, for example. The signal lines 25 supply the pixel signals to TFT elements Tr in the corresponding sub-pixels Vpix. The scanning lines 24 drive the TFT elements Tr. The signal lines 25 extend on a plane parallel to the surface of the glass substrate. The signal lines 25 supply the data for driving pixels generated based on the pixel signals for outputting an image to the sub-pixels Vpix. The sub-pixels Vpix each include the TFT element Tr and a liquid crystal element LC. The TFT element Tr is a thin film transistor, specifically, an n-channel metal oxide semiconductor (MOS) TFT in this example. One of the source and the drain of the TFT element Tr is coupled to a corresponding one of the signal lines 25, the gate thereof is coupled to a corresponding one of the scanning lines 24, and the other of the source and the drain thereof is coupled to a first end of the liquid crystal element LC. The first end of the liquid crystal element LC is coupled to the other of the source and the drain of the TFT element Tr. A second end of the liquid crystal element LC is coupled to a corresponding one of common electrodes COM. Each of the common electrodes COM is supplied with a drive signal from a drive electrode driver, which is not illustrated. The drive electrode driver may be part of the drive element 3 or an independent circuit.

The sub-pixel Vpix is coupled to other sub-pixels Vpix belonging to the same row in the display area 21 by one of the scanning lines 24. The scanning lines 24 are coupled to the gate driver and supplied with the vertical scanning pulse of a scanning signal from the gate driver. The sub-pixel Vpix is coupled to other sub-pixels Vpix belonging to the same column in the display area 21 by a corresponding one of the signal lines 25. The signal lines 25 are coupled to the source driver and supplied with the pixel signals from the source driver. The sub-pixel Vpix is also coupled to the other sub-pixels Vpix belonging to the same column in the display area 21 by a corresponding one of the common electrodes COM. Each of the common electrodes COM is coupled to the drive electrode driver, which is not illustrated, and supplied with the drive signal from the drive electrode driver.

The gate driver supplies the vertical scanning pulse to each of the gates of the TFT elements Tr of the respective sub-pixels Vpix via a corresponding one of the scanning lines 24. The gate driver thus sequentially selects one row (one horizontal line) out of the sub-pixels Vpix arranged in a matrix in the display area 21 as a target of image output. The source driver supplies, via the signal lines 25, the pixel signals to the sub-pixels Vpix included in the horizontal line sequentially selected by the gate driver. These sub-pixels Vpix perform image output of the horizontal line based on the supplied pixel signals.

As described above, the gate driver in the display device 2 drives the scanning lines 24 to sequentially scan the scanning lines 24, thereby sequentially selecting one horizontal line. The source driver in the display device 2 supplies the pixel signals to the sub-pixels Vpix belonging to the horizontal line via the signal lines 25, thereby performing image output on each horizontal line. To perform the image output operation, the drive electrode driver supplies the drive signal to each of the common electrodes COM corresponding to the horizontal line.

The display area 21 includes a color filter. The color filter includes a grid-like black matrix 76a and openings 76b. The black matrix 76a is formed to cover the outer peripheries of the sub-pixels Vpix as illustrated in FIG. 3. In other words, the black matrix 76a is arranged at boundaries between the two-dimensionally arranged sub-pixels Vpix, thereby having a grid shape. The black matrix 76a is made of a material having a high light absorption rate. The openings 76b are formed by the grid shape of the black matrix 76a and formed at positions corresponding to the respective sub-pixels Vpix.

The openings 76b have color areas corresponding to the sub-pixels Vpix of three colors (e.g., red (R), green (G), and blue (B)) or four colors. Specifically, the openings 76b have color areas colored with three colors of red (R), green (G), and blue (B), which are an aspect of a first color, a second color, and a third color, and a color area of a fourth color (e.g., white (W)), for example. In the color filter, the color areas colored with the three colors of red (R), green (G), and blue (B) are periodically arrayed on the respective openings 76b, for example. In a case where the fourth color is white (W), the color filter applies no color to the opening 76b of white (W). In a case where the fourth color is another color, the color filter applies the color employed as the fourth color to the opening 76b. In the color filter according to the present embodiment, the color areas of the three colors of R, G, and B and the fourth color (e.g., white (W)), that is, the color areas of four colors in total are arranged at the respective sub-pixels Vpix illustrated in FIG. 3, and the group of the sub-pixels Vpix of the four colors serve as one pixel Pix. The pixel signal supplied to one pixel according to the present embodiment corresponds to output of the pixel Pix including the sub-pixels Vpix of red (R), green (G), blue (B), and the fourth color (e.g., white (W)). In the description of the present embodiment, red (R), green (G), blue (B), and white (W) may be simply referred to as R, G, B, and W, respectively. In a case where the pixel Pix includes the sub-pixels Vpix of two or less colors or five or more colors, digital data corresponding to the number of colors is supplied based on the original image data.

The color filter may be a combination of other color as long as it is colored with difference colors. Color filters typically have higher luminance in the color area of green (G) than in the color areas of red (R) and blue (B). In a case where the fourth color is white (W), the color filter may be made of transmissive resin to produce white.

When viewed in a direction orthogonal to the front surface, the scanning lines 24 and the signal lines 25 in the display area 21 are arranged at areas overlapping with the black matrix 76a of the color filter. In other words, the scanning lines 24 and the signal lines 25 are hidden behind the black matrix 76a when viewed in the direction orthogonal to the front surface. In the display area 21, the areas not provided with the black matrix 76a correspond to the openings 76b.

Figure 4:
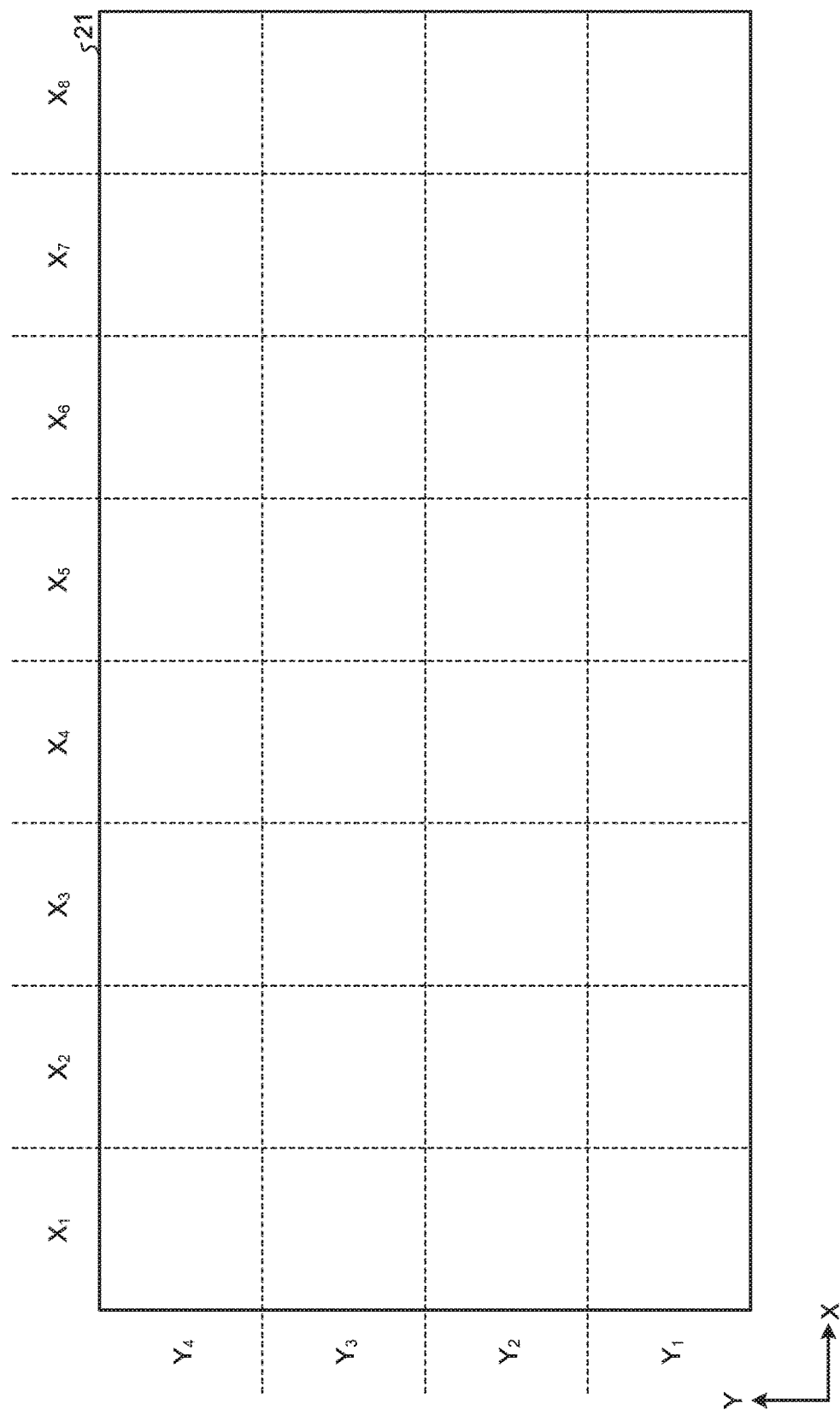
FIG. 4 is a diagram of an example of division in a display area.

FIG. 4 is a diagram of an example of division in the display area 21. The display area 21 is divided into a plurality of partial areas. Specifically, as illustrated in FIG. 4, for example, the display area 21 is divided into eight equal parts of $X_1, X_2, \ldots,$ and $X_8$ in the X-direction and four equal parts of $Y_1, Y_2, Y_3,$ and $Y_4$ in the Y-direction. As a result, the display area 21 has 8×4 partial areas. Let us assume a case where the display area 21 includes 800 pixels Pix in the X-direction and 480 pixels Pix in the Y-direction, that is, 800×480 pixels Pix arranged in a matrix, for example. In this case, one partial area illustrated in FIG. 4 includes 100×120 pixels Pix. The example illustrated in FIG. 4 and the number of pixels in the display area 21 are given by way of example only. The configuration is not limited thereto and may be appropriately changed.

Figure 5:
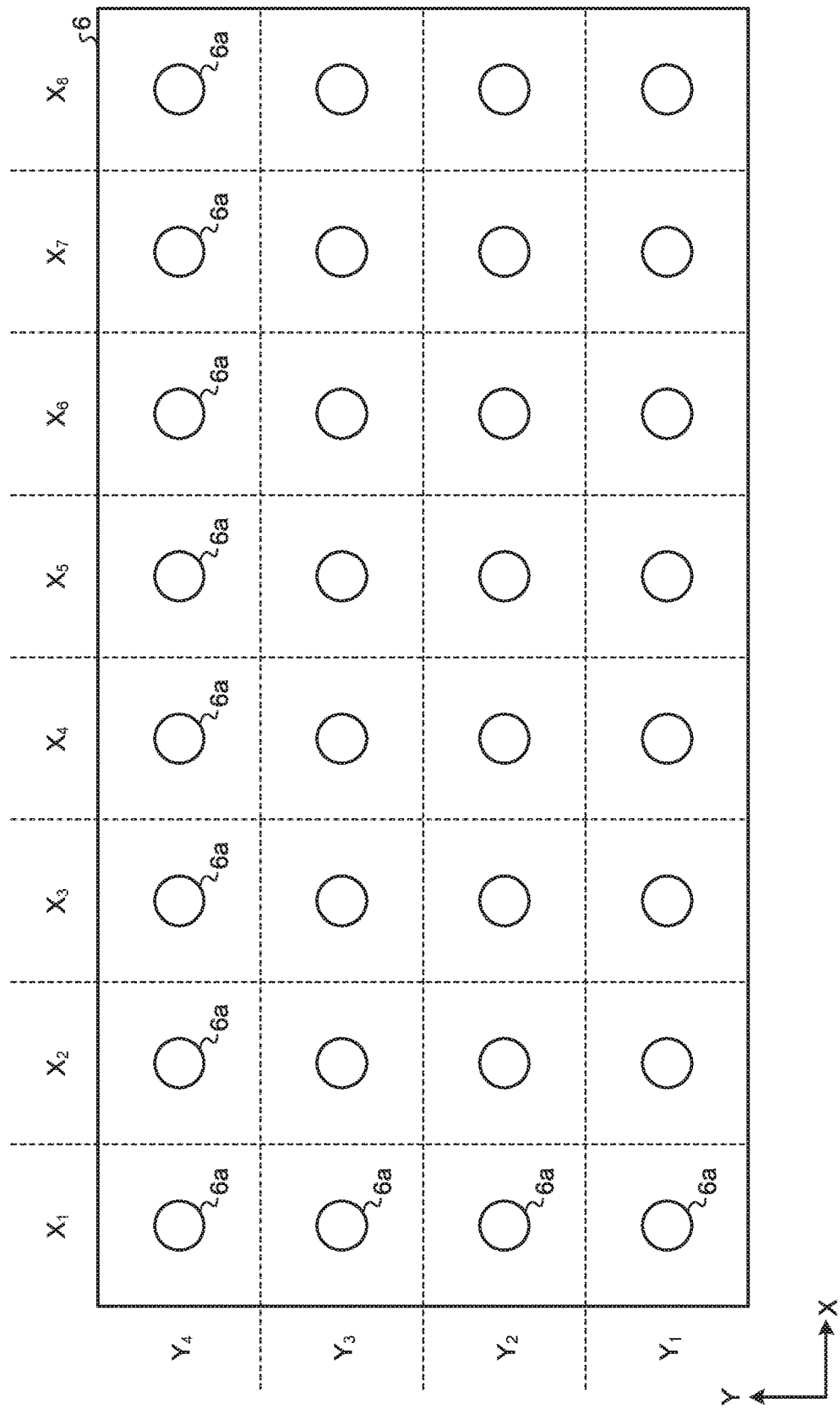
FIG. 5 is a diagram of an example of a correspondence relation between a plurality of light sources of a light source device and a plurality of partial areas.

FIG. 5 is a diagram of an example of the correspondence relation between the light sources 6a of the light source device 6 and the partial areas. The light sources 6a illustrated in FIG. 5 are arranged in a manner corresponding to the division of the partial areas illustrated in FIG. 4. The partial areas correspond to the light sources 6a of the light source device 6 on a one-to-one basis. Specifically, as illustrated in FIG. 5, for example, each of the partial areas is associated with a corresponding one of the light sources 6a. While the light source 6a is a light emitting diode (LED), for example, this is given as an example of the specific structure of the light source 6a. The structure is not limited thereto and may be appropriately changed. In the present embodiment, each of the partial areas in FIG. 5 is associated with a corresponding one of the light sources 6a. However, the configuration is not limited thereto and may be appropriately changed as long as it enables individual control of the amounts of light emission in the respective partial areas and adjustment of the luminance in each partial area.

The light from each light source 6a reaches not only a corresponding one of the partial areas precisely but also the partial areas near the corresponding one. When both of two light sources 6a corresponding to two adjacent partial areas are turned on, for example, the two partial areas are irradiated with synthesized light of the light from the two light sources 6a.

Figure 6:
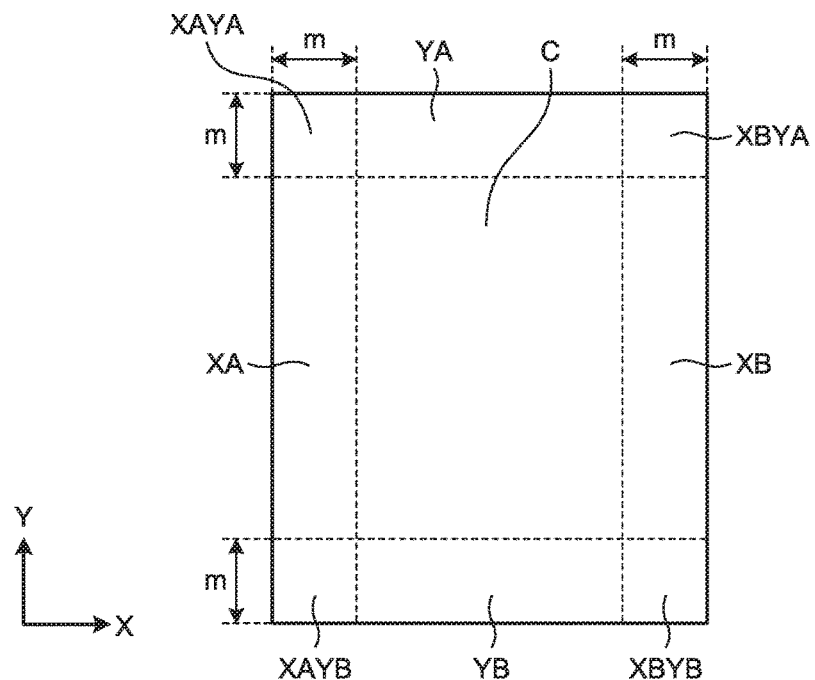
FIG. 6 is a diagram schematically illustrating a first area and second areas included in one partial area.

FIG. 6 is a diagram schematically illustrating a first area C and second areas XA, XB, YA, YB, XAYA, XBYA, XAYB, and XBYB included in one partial area. The partial areas each include a first area and second areas. The first area is irradiated with light from the light source 6a (first light source) corresponding to the partial area. The second areas are irradiated with light from the first light source and the light sources 6a (second light sources) adjacent to the first light source. Specifically, as illustrated in FIG. 6, for example, the partial area includes the first area C, the second areas XA and XB, and the second areas YA and YB. The first area C is positioned at the center of the partial area. The second areas XA and XB are positioned at both ends in the X-direction with the first area C interposed therebetween and have a width of in pixels. The second areas YA and YB are positioned at both ends in the Y-direction with the first area C interposed therebetween and have a width of m pixels. The second areas XAYA, XBYA, XAYB, and XBYB are positioned at four corners in the rectangular partial area and each composed of m×m pixels. The second areas XAYA, XBYA, XAYB, and XBYB may be independent second areas or part of the second areas present at the same position in the X-direction or the Y-direction. The area XAYA, for example, may be an independent second area, part of the second area XA, or part of the second area YA, m is a certain value (natural number), and m=8 is satisfied, for example. The pixel width of the second areas XA and XB at both ends in the X-direction and the pixel width of the second areas YA and YB at both ends in the Y-direction can be individually determined.

Figure 7:
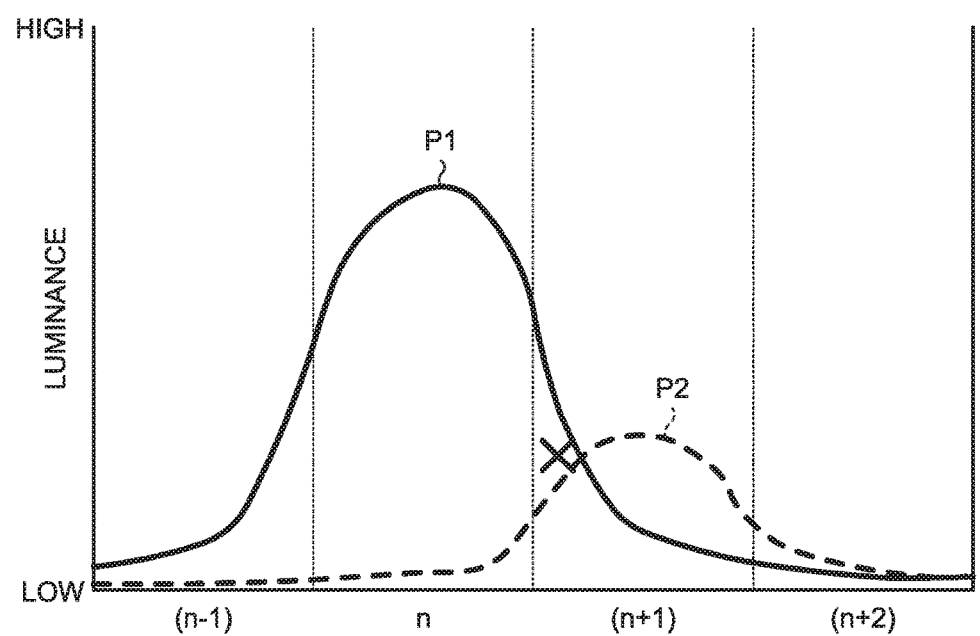
FIG. 7 is a graph of an example of a relation between luminance distributions of four partial areas successively arranged in one direction and required luminance for one partial area.

FIG. 7 is a graph of an example of a relation between luminance distributions of four partial areas (n−1), n, (n+1), and (n+2) successively arranged in one direction and required luminance for one partial area (n+1). The horizontal axis in FIG. 7 and FIGS. 9 and 10, which will be described later, is one of the X-direction and the Y-direction. In the conventional technique, when the pixel Pix is driven at the output gradation value that requires light from the light source 6a in a certain partial area (e.g., the partial area (n+1)), the light source 6a corresponding to the certain partial area is turned on. Specifically, when the pixel Pix included in the partial area (n+1) is driven at the output gradation value that requires the luminance represented by the cross in FIG. 7, for example, the light source 6a corresponding to the partial area (n+1) is turned on as indicated by the luminance distribution represented by the broken line P2.

If the luminance required for the pixel Pix included in the partial area (n+1) can be secured by the luminance distribution obtained by turning on the light source 6a corresponding to the area (e.g., the partial area n) adjacent to the partial area (n+1) as indicated by the line P1 in FIG. 7, for example, the light source 6a corresponding to the partial area (n+1) does not need to be turned on. Specifically, let us assume a case where the light source 6a corresponding to the partial area n is the second light source and the light source 6a corresponding to the partial area (n+1) is the first light source. In this case, the relation between the partial areas n and (n+1) illustrated in FIG. 7 is established for the second area of the partial area (n+1) irradiated with the light from the first light source and the second light source adjacent to the first light source. In other words, if the light required for the second area of the partial area (n+1) can be obtained by the light from the light source 6a corresponding to the partial area n, the light source 6a corresponding to the partial area (n+1) is not necessarily turned on. In this case, however, if the first area irradiated with the light from the light source 6a corresponding to the partial area (n+1) requires light, the light source 6a corresponding to the partial area (n+1) needs to be turned on.

The control device 100 according to the present embodiment controls the operations of the first light source based on whether the first area requires the light from the first light source and whether the second area obtains light required for display output by receiving the light from the second light source. The first light source may be the light source 6a corresponding to the partial area (n+1) in FIG. 7, for example. The second light source may be the light source 6a corresponding to the partial area n in FIG. 7, for example. Specifically, if the first area does not require the light from the first light source and the second area obtains light required for display output by receiving the light from the second light source, the control device 100 serving as the light source controller 102 turns off the first light source.

Figure 8:
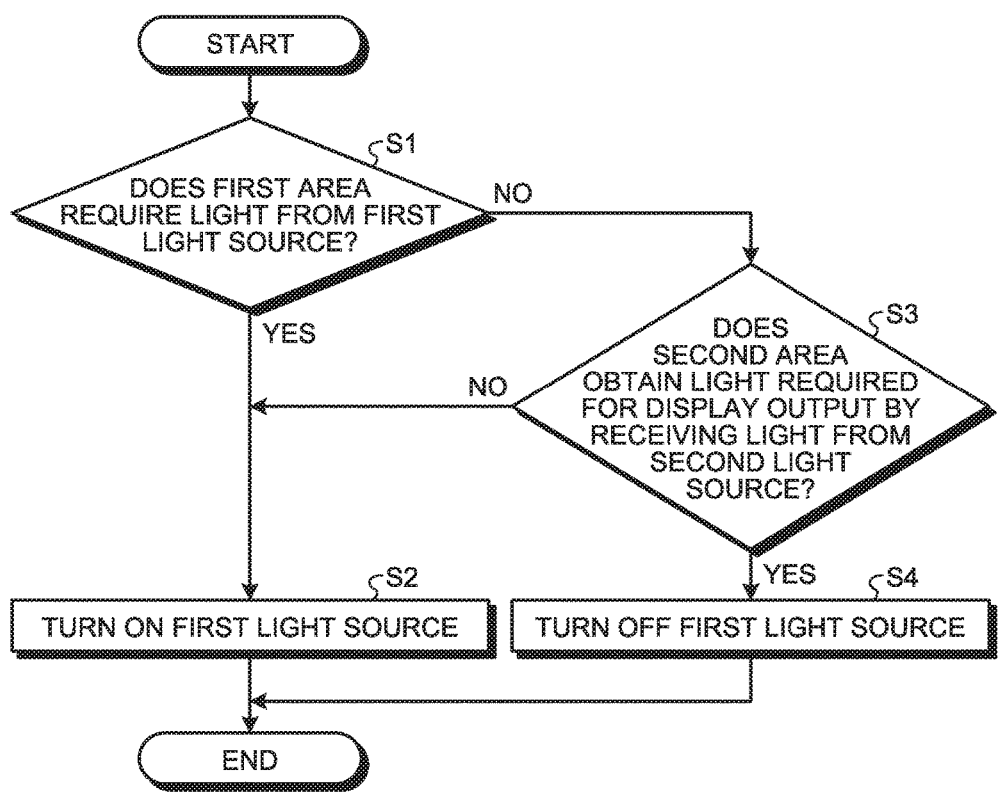
FIG. 8 is a flowchart of an example of processing for lighting control of a first light source.

FIG. 8 is a flowchart of an example of processing for lighting control of the first light source. The control device 100 determines whether the first area requires the light from the first light source (Step S1). If the control device 100 determines that the first area requires the light from the first light source (Yes at Step S1), the control device 100 turns on the first light source (Step S2). If the control device 100 determines that the first area does not require the light from the first light source (No at Step S1), the control device 100 determines whether the second area obtains light required for display output by receiving the light from the second light source (Step S3). If the control device 100 determines that the second area obtains light required for display output by receiving the light from the second light source (Yes at Step S3), the control device 100 turns off the first light source (Step S4). If the control device 100 determines that the second area does not obtain light required for display output by receiving the light from the second light source (No at Step S3), the control device 100 turns on the first light source (Step S2).

Figure 9:
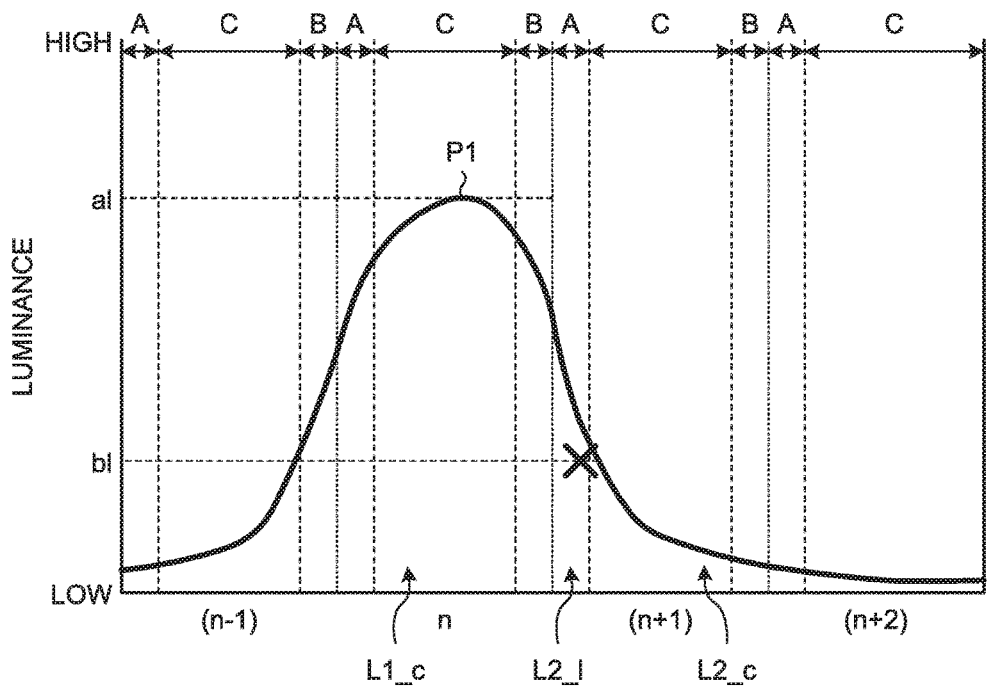
FIG. 9 is a graph of an example of a case where the luminance required for the second area in one partial area is secured with light from a light source corresponding to the partial area and a light source adjacent thereto.

FIG. 9 is a graph of an example of a case where the luminance required for the second area in one partial area is secured with light from the light source 6a corresponding to the partial area and the light source 6a adjacent thereto. The combination of A and B in FIG. 9 corresponds to one of the combination of the second areas XA and XB and the combination of the second areas YA and YB.

In the example illustrated in FIG. 9, the control device 100 turns on the light source 6a corresponding to the partial area n such that the light source 6a provides the luminance distribution indicated by the line P1 based on luminance al required for a first area L1_c of the partial area n. Let us assume a case where a second area L2_l positioned adjacent to the partial area n out of the second areas of the partial area (n+1) requires light having luminance bl. The luminance distribution provided by the light from the light source 6a corresponding to the partial area n indicated by the line P1 provides luminance higher than the luminance bl to the second area L2_l. In other words, the luminance required for the second area L2_l is sufficiently secured with the light from the light source 6a corresponding to the partial area n.

In the example illustrated in FIG. 9, a first area L2_c and the second areas other than the second area L2_l of the partial area (n+1) require no light. In this case, the first area of the partial area (n+1) does not require the light from the light source 6a corresponding to the partial area (n+1), and the second area thereof obtains light required for display output by receiving the light from the second light source (e.g., the light source 6a corresponding to the partial area n). Consequently, the light source controller 102 turns off the light source 6a corresponding to the partial area (n+1).

More specifically, the light source controller 102 compares the luminance bl with a value (al×Coef) obtained by multiplying the luminance al by a predetermined coefficient Coef, for example. If bl<al×Coef is satisfied, the light source controller 102 turns off the light source 6a corresponding to the partial area (n+1). The predetermined coefficient Coef takes a value of 0 to 1. The predetermined coefficient Coef is used to calculate the luminance provided to the second area (e.g., L2_l) positioned adjacent to a certain partial area out of the second areas of another partial area adjacent to the certain partial area by the light source 6a turned on based on the luminance (e.g., the luminance al) required for the first area (e.g., the first area L1_c) of the certain partial area. Instead of the coefficient Coef, the light source controller 102 may hold information indicating the luminance distributions of the respective light sources 6a that can change depending on the magnitude of the luminance required for the first area. The light source controller 102 may use the information to identify the luminance of light provided to the adjacent second area, that is, the luminance corresponding to (al×Coef). The luminance required for the areas (e.g., the luminance al and bl) are identified by the control device 100 based on the output gradation values of the respective areas. Specifically, for example, the control device 100 holds information in which the output gradation values are associated with luminance required for the pixels Pix driven at the respective output gradation values.

To simplify the explanation, FIG. 9 illustrates only the relation between one partial area (second area L2_l) and the light source 6a corresponding to the partial area n. In actual control, the light source controller 102 performs the determination processing on all the second areas of the partial areas in the same manner as that described above.

The following describes a case where the second areas XAYA, XBYA, XAYB, and XBYB are handled as part of the second areas present at the same position in the X-direction or the Y-direction. The light source controller 102, for example, sets a predetermined flag value (e.g., deepblack flag (DF)) to a predetermined initial value (e.g., 1) for each of the first area C and the second areas XA, XB, YA, and YB illustrated in FIG. 6. The light source controller 102 determines whether the first area C includes a pixel Pix having an output gradation value that requires light. If the light source controller 102 determines that the first area C includes a pixel Pix having an output gradation value that requires light, the light source controller 102 changes DF of the first area C. Specifically, the light source controller 102 sets DF to 0, for example.

The light source controller 102 determines whether the second area XA includes a pixel Pix having an output gradation value that requires light. If the light source controller 102 determines that the second area XA includes a pixel Pix having an output gradation value that requires light, the light source controller 102 compares the luminance (e.g., the luminance bl) of the light required for the second area XA with the luminance (e.g., al×Coef) provided by the light from the light source 6a corresponding to the partial area adjacent to the second area XA. Through the comparison, the light source controller 102 determines whether the luminance required for the second area XA is sufficiently secured with the light from the light source 6a. If the light source controller 102 determines that the luminance required for the second area XA is not sufficiently secured with the light from the light source 6a, the light source controller 102 changes DF of the second area XA. The light source controller 102 performs the determination processing on the second areas XB, YA, and YB in the same manner as that for the second area XA. Based on the determination result, the light source controller 102 changes DF of each of the second areas.

The light source controller 102 checks whether all the values of DF set for the first, area C and the second areas XA, XB, YA, and YB of the partial area are the initial value. If all the values of DF are the initial value, the light source controller 102 turns off the light source 6a corresponding to the partial area. By contrast, if at least one DF is not the initial value, the light source controller 102 turns on the light source 6a corresponding to the partial area.

The following describes a case where the second areas XAYA, XBYA, XAYB, and XBYB are handled as independent second areas. The light source controller 102, for example, sets a predetermined flag value (e.g., DF) to a predetermined initial value (e.g., 1) for each of the first area C and the second areas XA, XB, YA, YB, XAYA, XBYA, XAYB, and XBYB illustrated in FIG. 6. The light source controller 102 determines whether the first area C includes a pixel Pix having an output gradation value that requires light. If the light source controller 102 determines that the first area C includes a pixel Pix having an output gradation value that requires light, the light source controller 102 changes DF of the first area C. Specifically, the light source controller 102 sets DF to 0, for example.

The light source controller 102 determines whether the second area XA, includes a pixel Pix having an output gradation value that requires light. If the light source controller 102 determines that the second area XA includes a pixel Pix having an output gradation value that requires light, the light source controller 102 compares the luminance (e.g., the luminance bl) of the light required for the second area XA with the luminance (e.g., a1×Coef) provided by the light from the light source 6a corresponding to the partial area adjacent to the second area XA. Through the comparison, the light source controller 102 determines whether the luminance required for the second area XA can be sufficiently secured with the light from the light source 6a. If the light source controller 102 determines that the luminance required for the second area XA is not sufficiently secured with the light from the light source 6a, the light source controller 102 changes DF of the second area XA. The light source controller 102 performs the determination processing on the second areas XB, YA, YB, XAYA, XBYA, XAYB, and XBYB in the same manner as that for the second area XA. Based on the determination result, the light source controller 102 changes DF of each of the second areas.

The light source controller 102 checks whether all the values of DF set for the first area C and the second areas XA, XB, YA, YB, XAYA, XBYA, XAYB, and XBYB of the partial area are the initial value. If all the values of DF are the initial value, the light source controller 102 turns off the light source 6a corresponding to the partial area. By contrast, if at least one DF is not the initial value, the light source controller 102 turns on the light source 6a corresponding to the partial area.

The light source controller 102 performs the determination processing and performs lighting control in the same manner as that described above on all the partial areas individually. Specifically, the light source controller 102 handles the partial area $(X_1, Y_4)$ illustrated in FIG. 4 as a first determination target, for example. The light source controller 102 performs the determination processing sequentially from the first determination target to the last determination target in one direction (e.g., the X-direction). If the determination processing is completed for all the partial areas in the one direction, the light source controller 102 shifts the determination target by one line in another direction (e.g., the Y-direction). Thus, the light source controller 102 sequentially performs the setting of DF and the determination related to a change of DF on all the partial areas. The light source controller 102 also performs the lighting control sequentially.

Each of the second areas XAYA, XBYA, XAYB, and XBYB is subjected to the effect to light from two light sources 6a corresponding to two partial areas adjacent thereto. In view of the above-described fact, the predetermined coefficient Coef may differ between the second areas XAYA, XBYA, XAYB, and XBYB and the second areas XA, XB, YA, and YB. Because the partial area according to the present embodiment includes 100×120 pixels Pix, the degree of the effect of light from the light source 6a corresponding to the adjacent partial area can differ between the second areas XA and XB and the second areas YA and YB. In view of the above-described fact, the predetermined coefficient Coef may differ between the second areas XA and XB and the second areas YA and YB. In view of individual differences of the light source 6a in the respective partial areas, for example, the predetermined coefficient Coef may be set individually for each of the partial areas.

As described above, the present embodiment controls the operations of the first light source based on whether the first area requires the light from the first light source and whether the second area obtains light required for display output by receiving the light from the second light source. If the first area does not require the light from the first light source and if the second area obtains light required for display output by receiving the light from the second light source, the first light source is turned off. As a result, the display apparatus according to the present embodiment can reduce the power consumption compared with a case where the first light source is turned on. Consequently, the display apparatus capable of achieving power saving can be provided.

Modifications

The following describes modifications of the embodiment according to the present invention. In the description of the modifications, components similar to those according to the embodiment are denoted by the same reference numerals, and overlapping explanation thereof may be omitted. The control device 100 serving as the light source controller 102 may control the operations of the second light source that can irradiate the second area based on a result of comparison between the luminance of light required for the second area and a predetermined threshold.

Figure 10:
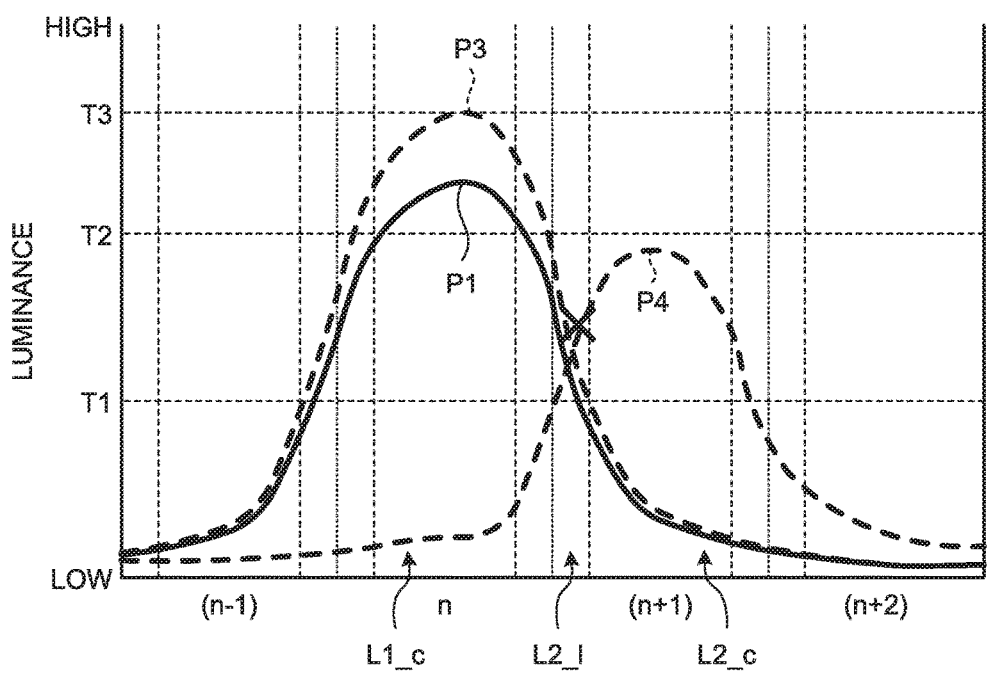
FIG. 10 is a graph of an example of a relation between the luminance of light required for the second area and a predetermined threshold.

FIG. 10 is a graph of an example of a relation between the luminance of light required for the second area and a predetermined threshold. Assume that $L2\_lq$ denotes the luminance of light required for the second area $L2\_l$, $L1\_cq$ denotes the luminance of light required for the first area $L1\_c$ corresponding to the second light source, T1 denotes a first threshold obtained by multiplying $L1\_cq$ by a first coefficient (Coef1) of 0 to 1, and BL1 denotes the luminance of the first area $L1\_c$ obtained by turning on the second light source. When Expression (1) is satisfied, the control device 100 serving as the light source controller 102 turns on the second light source such that the second light source provides the luminance calculated by Expression (2). More specifically, assume that T2 denotes a second threshold obtained by multiplying L1_$cq$ by a second coefficient of 0 to 1 and larger than the first coefficient. When Expression (3) is satisfied, the control device 100 serving as the light source controller 102 turns on the second light source such that the second light source provides the luminance calculated by Expression (2).

$$L2\_lq \geq T1 \quad (1)$$

$$BL1 = L1\_cq \times (L2\_lq/T1) \quad (2)$$

$$L2\_lq \leq T2 \quad (3)$$

Assume that T3 denotes the highest luminance of the second light source. When Expression (4) is satisfied in the luminance calculated by Expression (2), the control device 100 serving as the light source controller 102 can perform processing according to one or more of a plurality of settings. The following describes examples of the settings in order of first setting, second setting, and third setting. Any one of the settings may be arbitrarily employed.

$$BL1 > T3 \quad (4)$$

First Setting

The light source controller 102 updates, using Expression (5), the luminance (BL1) of the first area L1_$c$ obtained by turning on the second light source. If update is performed using Expression (5), the luminance distribution of the second light source is indicated by the broken line P3, for example.

$$BL1 = T3 \quad (5)$$

Second Setting

Assume that Coef2 denotes the second coefficient and that BL2 denotes the luminance of the second area L2_$l$ obtained by turning on the first light source. The light source controller 102 turns on the first light source such that the first light source provides the luminance calculated by Expression (6) in addition to performing the processing of the first setting.

$$BL2 = L2\_lq - (T3 \times \text{Coef2}) \quad (6)$$

Third Setting

Assume that BL2 denotes the luminance of the second area L2_$l$ obtained by turning on the first light source. When Expression (4) is satisfied in the luminance calculated by Expression (2), the light source controller 102 updates the luminance using Expression (7) and turns on the first light source such that the first light source provides the luminance calculated by Expression (8). If the first light source is turned on so as to provide the luminance calculated by Expression (8), the luminance distribution of the first light source is indicated by the broken line P4, for example.

$$BL1 = L1\_cq \quad (7)$$

$$BL2 = L2\_lq \quad (8)$$

As described above, the light source controller 102 of the modification controls the operation of the second light source based on the result of comparison between the luminance of light required for the second area and the predetermined threshold. This can provide a mechanism that secures the luminance of the second area more flexibly.

When Expression (1) is satisfied, the light source controller 102 of the modification turns on the second light source such that the second light source provides the luminance calculated by Expression (2). As a result, the light source controller 102 of the modification can control the operation of the second light source by performing formulated luminance control, thereby securing the luminance required for the second area. This can provide a mechanism that secures the luminance required for the second area more systematically.

When Expression (3) is satisfied, the light source controller 102 of the modification turns on the second light source such that the second light source provides the luminance calculated by Expression (2). As a result, the light source controller 102 of the modification can more appropriately determine the conditions in which Expression (2) is suitably used.

When the the control device 100 employs the first setting, the highest luminance obtained without turning on the first light source can be secured in the second area.

When the the control device 100 employs the second setting, the luminance required for the second area can be secured while minimizing the amount of light emission from the first light source.

When the the control device 100 employs the third setting, the luminance required for the second area can be secured without changing the amount of light emission from the second light source.

In the first setting, for example, the display controller 101 may correct the output gradation values, thereby supplementing the luminance of the second area. Let us assume a case where the output gradation value of the pixel Pix that requires the highest luminance in the second area is expressed by (R,G,B,W)=(0,0,0,100) and the ratio of the luminance (L2_$lq$) of light required for the second area to the highest luminance (T3) of the second light source is 1.2:1, for example. In this case, the display controller 101 corrects the output gradation value of (R,G,B,W)=(0,0,0,100) to (R,G,B,W)=(0,0,0,100,120), thereby supplementing the luminance of the second area. By using the same mechanism as that described above, the display controller 101 may correct the output gradation values of the pixels Pix included in the partial area irradiated with the light from the second light source increased to the highest luminance (T3).

The present invention naturally provides advantageous effects clearly defined by the description in the present specification or appropriately conceivable by those skilled in the art out of other advantageous effects provided by the aspects described in the present embodiment.

The present disclosure includes the following aspects:

1. A display apparatus comprising:

a plurality of light sources aligned in at least one direction;

a display device that has a display area provided with a plurality of pixels, the display device being irradiated with light from the light sources to output an image; and a controller that controls an operation of the light sources in accordance with a display output content of the display device, wherein the display area includes a plurality of partial areas, the partial areas corresponding to the light sources on a one-to-one basis, wherein each of the partial areas includes a first area and a second area, the first area being irradiated with light from a first light source that corresponds thereto, and the second area being irradiated with light from the first light source that corresponds to the first area and a second light source adjacent to the first light source that corresponds to the first area, and wherein the controller controls an operation of the first light source based on whether the first area requires the light from the first light source and whether the second area obtains light required for display output by receiving the light from the second light source.

2. The display apparatus according to 1, wherein, when the first area does not require the light from the first light source and the second area obtains the light required for display output by receiving the light from the second light source, the controller turns off the first light source.

3. The display apparatus according to 1 or 2, wherein the controller controls an operation of the second light source based on a result of comparison between luminance of light required for the second area and a predetermined threshold.

4. The display apparatus according to 3,
wherein, when Expression (1)

$$L2\_lq \geq T1 \qquad (1)$$

is satisfied, the controller turns on the second light source such that the second light source provides luminance calculated by Expression (2)

$$BL1 = L1\_cq \times (L2\_lq/T1) \qquad (2)$$

where $L2\_lq$ is the luminance of light required for the second area, $L1\_cq$ is luminance of light required for the first area corresponding to the second light source, T1 is a first threshold obtained by multiplying $L1\_cq$ by a first coefficient of 0 to 1, and BL1 is luminance of the first area obtained by turning on the second light source.

5. The display apparatus according to 4,
wherein, when Expression (3)

$$L2\_lq \leq T2 \qquad (3)$$

is satisfied, the controller turns on the second light source such that the second light source provides the luminance calculated by Expression (2)

where T2 is a second threshold obtained by multiplying $L1\_cq$ by a second coefficient of 0 to 1 and larger than the first coefficient.

6. The display apparatus according to 4 or 5,
wherein, when Expression (4)

$$BL1 > T3 \qquad (4)$$

is satisfied in the luminance calculated by Expression (2), the controller updates the luminance using Expression (5)

$$BL1 = T3 \qquad (5)$$

where T3 is the highest luminance of the second light source.

7. The display apparatus according to 5,
wherein the controller turns on the first light source such that the first light source provides luminance calculated by Expression (6)

$$BL2 = L2\_lq - (T3 \times \text{Coef2}) \qquad (6)$$

where Coef2 is the second coefficient, and BL2 is luminance of the second area obtained by turning on the first light source.

8. The display apparatus according to 4 or 5,
wherein, when Expression (4)

$$BL1 > T3 \qquad (4)$$

is satisfied in the luminance calculated by Expression (2), the controller updates the luminance using Expression (7)

$$BL1 = L1\_cq \qquad (7)$$

and turns on the first light source such that the first light source provides luminance calculated by Expression (8)

$$BL2 = L2\_lq \qquad (8)$$

where T3 is the highest luminance of the second light source, and BL2 is luminance of the second area obtained by turning on the first light source.

9. A method for driving a display apparatus,
the display apparatus comprising:
a plurality of light, sources aligned in at least one direction;
a display device that has a display area provided with a plurality of pixels, the display device being irradiated with light from the light sources to output an image; and
a controller that controls an operation of the light sources in accordance with a display output content of the display device,
the display area including a plurality of partial areas, the partial areas corresponding to the light sources on a one-to-one basis, and
each of the partial areas including a first area and a second area, the first area being irradiated with light from a first light source that corresponds thereto, and the second area being irradiated with light from the first light source that corresponds to the first area and a second light source adjacent to the first light source that corresponds to the first area,
the method comprising controlling an operation of the first light source based on whether the first area requires the light from, the first light source and whether the second area obtains light required for display output by receiving the light from the second light source.

10. The method for driving the display apparatus according to 9, further comprising
turning off the first light source when the first, area does not require the light from the first light source and when the second area obtains the light required for display output by receiving the light from, the second light source.

11. The method for driving the display apparatus according to 9 or 10, further comprising
controlling an operation of the second light, source based on a result of comparison between luminance of light required for the second area and a predetermined threshold.

12. The method for driving the display apparatus according to 11, further comprising,
when Expression (1)

$$L2\_lq \geq T1 \qquad (1)$$

is satisfied, turning on the second light source such that the second light source provides luminance calculated by Expression (2)

$$BL1 = L1\_cq \times (L2\_lq/T1) \qquad (2)$$

where $L2\_lq$ is the luminance of light required for the second area, $L1\_cq$ is luminance of light required for the first area corresponding to the second light source, T1 is a first threshold obtained by multiplying $L1\_cq$ by a first coefficient of 0 to 1, and BL1 is luminance of the first area obtained by turning on the second light source.

13. The method for driving the display apparatus according to 12, further comprising,
when Expression (3)

$$L2\_lq \leq T2 \quad (3)$$

is satisfied, turning on the second light source such that the second light source provides the luminance calculated by Expression (2)
where T2 is a second threshold obtained by multiplying L1_cq by a second coefficient of 0 to 1 and larger than the first coefficient.

14. The method for driving the display apparatus according to 12 or 13, further comprising,
when Expression (4)

$$BL1 > T3 \quad (4)$$

is satisfied in the luminance calculated by Expression (2), updating the luminance using Expression (5)

$$BL1 = T3 \quad (5)$$

where T3 is the highest luminance of the second light source,

15. The method for driving the display apparatus according to 13, further comprising
turning on the first light source such that the first light source provides luminance calculated by Expression (6)

$$BL2 = L2\_lq - (T3 \times Coef2) \quad (6)$$

where Coef2 is the second coefficient, and BL2 is luminance of the second area obtained by turning on the first light source.

16. The method for driving the display apparatus according to 12 or 13, further comprising,
when Expression (4)

$$BL1 > T3 \quad (4)$$

is satisfied in the luminance calculated by Expression (2), updating the luminance using Expression (7)

$$BL1 = L1\_cq \quad (7)$$

and turning on the first light source such that the first light source provides luminance calculated by Expression (8)

$$BL2 = L2\_lq \quad (8)$$

where T3 is the highest luminance of the second light source, and BL2 is luminance of the second area obtained by turning on the first light source.

What is claimed is:
1. A display apparatus comprising:
a plurality of light sources aligned in at least one direction;
a display device that has a display area provided with a plurality of pixels, the display device being irradiated with light from the light sources to output an image; and
a controller that controls an operation of the light sources in accordance with a display output content of the display device,
wherein the display area includes a plurality of partial areas, the partial areas corresponding to the light sources on a one-to-one basis,
wherein each of the partial areas includes a first area and a second area, the first area being irradiated with light from a first light source that corresponds thereto, and the second area being irradiated with light from the first light source that corresponds to the first area and a second light source adjacent to the first light source,
wherein the controller controls an operation of the first light source based on whether the first area requires the light from the first light source and whether the second area obtains light required for display output by receiving the light from the second light source,
wherein the controller controls an operation of the second light source based on a result of comparison between luminance of light required for the second area and a predetermined threshold, and
wherein, when Expression (1)

$$L2\_lq \geq T1 \quad (1)$$

is satisfied, the controller turns on the second light source such that the second light source provides luminance calculated by Expression (2)

$$BL1 = L1\_cq \times (L2\_lq/T1) \quad (2)$$

where L2_lq is the luminance of light required for the second area, L1_cq is luminance of light required for the first area corresponding to the second light source, T1 is a first threshold obtained by multiplying L1_cq by a first coefficient of 0 to 1, and BL1 is luminance of the first area obtained by turning on the second light source.

2. The display apparatus according to claim 1,
wherein, when Expression (3)

$$L2\_lq \leq T2 \quad (3)$$

is satisfied, the controller turns on the second light source such that the second light source provides the luminance calculated by Expression (2)
where T2 is a second threshold obtained by multiplying L1_cq by a second coefficient of 0 to 1 and larger than the first coefficient.

3. The display apparatus according to claim 1,
wherein, when Expression (4)

$$BL1 > T3 \quad (4)$$

is satisfied in the luminance calculated by Expression (2), the controller updates the luminance using Expression (5)

$$BL1 = T3 \quad (5)$$

where T3 is the highest luminance of the second light source.

4. The display apparatus according to claim 2,
wherein the controller turns on the first light source such that the first light source provides luminance calculated by Expression (6)

$$BL2 = L2\_lq - (T3 \times Coef2) \quad (6)$$

where Coef2 is the second coefficient, and BL2 is luminance of the second area obtained by turning on the first light source.

5. The display apparatus according to claim 1,
wherein, when Expression (4)

$$BL1 > T3 \quad (4)$$

is satisfied in the luminance calculated by Expression (2), the controller updates the luminance using Expression (7)

$$BL1 = L1\_cq \quad (7)$$

and turns on the first light source such that the first light source provides luminance calculated by Expression (8)

$$BL2 = L2\_lq \quad (8)$$

where T3 is the highest luminance of the second light source, and BL2 is luminance of the second area obtained by turning on the first light source.

6. A method for driving a display apparatus, the display apparatus comprising: a plurality of light sources aligned in at least one direction; a display device that has a display area provided with a plurality of pixels, the display device being irradiated with light from the light sources to output an image; and a controller that controls an operation of the light sources in accordance with a display output content of the display device, the display area including a plurality of partial areas, the partial areas corresponding to the light sources on a one-to-one basis, and each of the partial areas including a first area and a second area, the first area being irradiated with light from a first light source that corresponds thereto, and the second area being irradiated with light from the first light source that corresponds to the first area and a second light source adjacent to the first light source, the method comprising:

controlling an operation of the first light source based on whether the first area requires the light from the first light source and whether the second area obtains light required for display output by receiving the light from the second light source; and controlling an operation of the second light source based on a result of comparison between luminance of light required for the second area and a predetermined threshold, when Expression (1)

$$L2\_lq \geq T1 \qquad (1)$$

is satisfied, turning on the second light source such that the second light source provides luminance calculated by Expression (2)

$$BL1 = L1\_cq \times (L2\_lq/T1) \qquad (2)$$

where $L2\_lq$ is the luminance of light required for the second area, $L1\_cq$ is luminance of light required for the first area corresponding to the second light source, T1 is a first threshold obtained by multiplying $L1\_cq$ by a first coefficient of 0 to 1, and BL1 is luminance of the first area obtained by turning on the second light source.

7. The method for driving the display apparatus according to claim 6, further comprising, when Expression (3)

$$L2\_lq \leq T2 \qquad (3)$$

is satisfied, turning on the second light source such that the second light source provides the luminance calculated by Expression (2)

where T2 is a second threshold obtained by multiplying $L1\_cq$ by a second coefficient of 0 to 1 and larger than the first coefficient.

8. The method for driving the display apparatus according to claim 6, further comprising, when Expression (4)

$$BL1 > T3 \qquad (4)$$

is satisfied in the luminance calculated by Expression (2), updating the luminance using Expression (5)

$$BL1 = T3 \qquad (5)$$

where T3 is the highest luminance of the second light source.

9. The method for driving the display apparatus according to claim 7, further comprising turning on the first light source such that the first light source provides luminance calculated by Expression (6)

$$BL2 = L2\_lq - (T3 \times Coef2) \qquad (6)$$

where Coef2 is the second coefficient, and BL2 is luminance of the second area obtained by turning on the first light source.

10. The method for driving the display apparatus according to claim 6, further comprising, when Expression (4)

$$BL1 > T3 \qquad (4)$$

is satisfied in the luminance calculated by Expression (2), updating the luminance using Expression (7)

$$BL1 = L1\_cq \qquad (7)$$

and turning on the first light source such that the first light source provides luminance calculated by Expression (8)

$$BL2 = L2\_lq \qquad (8)$$

where T3 is the highest luminance of the second light source, and BL2 is luminance of the second area obtained by turning on the first light source.

* * * * *